Jan. 14, 1936.  A. E. DEARING ET AL  2,027,813
DEVICE FOR ADMITTING AIR AND WATER TO THE CYLINDERS
OF AN INTERNAL COMBUSTION ENGINE
Filed Jan. 29, 1934
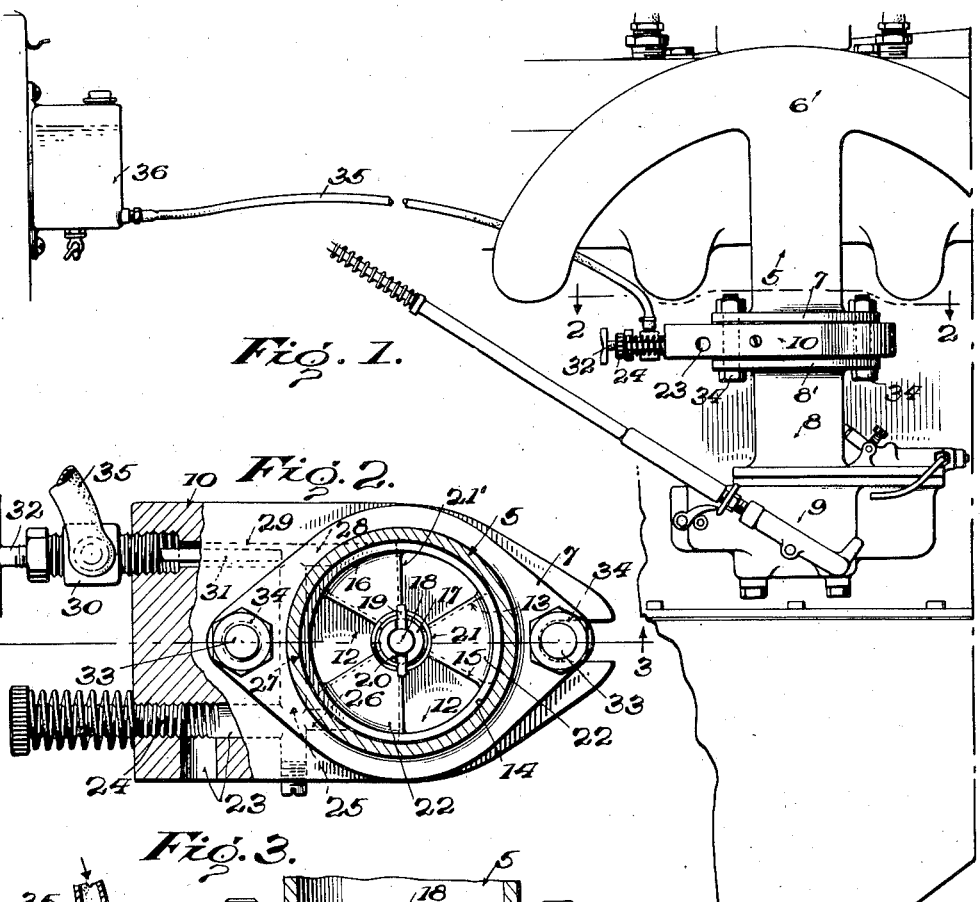
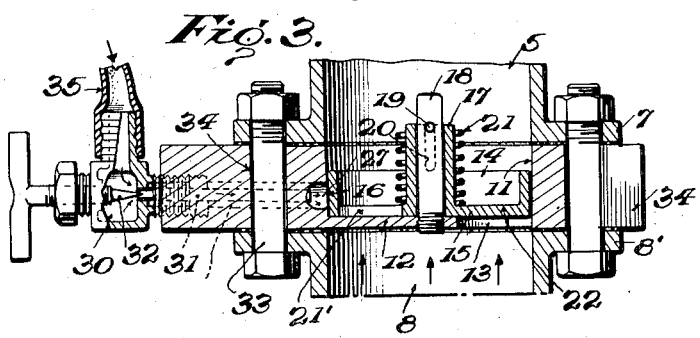
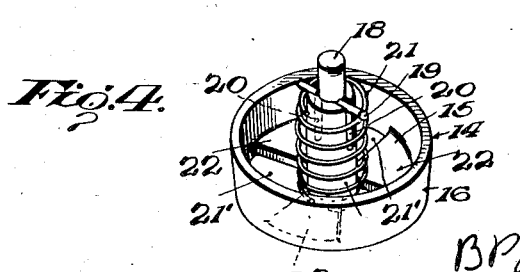
INVENTORS
A. E. Dearing and
BY W. B. Parker
ATTORNEY

UNITED STATES PATENT OFFICE 2,027,813

DEVICE FOR ADMITTING AIR AND WATER TO THE CYLINDERS OF AN INTERNAL COMBUSTION ENGINE

Alfred E. Dearing and William B. Parker, Manchester, Tenn.

Application January 29, 1934, Serial No. 708,873

3 Claims. (Cl. 137—152)

Our invention relates to a device to admit air and water to the intake manifold of an internal combustion engine.

An important object of the invention is to provide a device of the above mentioned character which is automatic in operation and will function to supply the volume of water and air to the intake manifold of the engine, in proportion to the degree of suction in the intake manifold.

A further object of the invention is to provide a device of the above mentioned character which may be conveniently connected between the intake manifold and the outlet pipe of the carburetor, without altering the construction of the same.

A further object of the invention is to provide a device of the above mentioned character which will thoroughly atomize the water and properly mix the same with the air, so that the air saturated or laden with water vapor will be supplied to the intake manifold of the engine.

Other objects and advantages of the invention will be apparent during the course of the following description.

In the accompanying drawing forming a part of this application and in which like numerals are employed to designate like parts throughout the same, Figure 1 is a side elevation of a device embodying our invention, showing the same in use, Figure 2 is a horizontal section taken on line 2—2 of Figure 1, parts broken away, Figure 3 is a longitudinal vertical section taken on line 3—3 of section 2, and, Figure 4 is a perspective view of the valve element.

In the drawing, wherein for the purpose of illustration is shown a preferred embodiment of our invention, the numeral 5 designates the inlet tubular coupling of an intake manifold 6 of an internal combustion engine. This inlet coupling has a flange 7. The numeral 8 designates the outlet tubular coupling of a carburetor 9, of any well known or preferred type. The coupling 8 has a flange 8'.

Our device embodies a body portion or block 10, having a main chamber or bore 11, which is substantially cylindrical but preferably increases in diameter slightly toward its upper end. The chamber 11 has its top formed entirely open, while the bottom of the chamber is covered by a plate or web 12, having segmental openings 13 formed therein. The segmental openings are preferably equidistantly spaced, as shown.

Mounted to vertically slide within the chamber 11 is a valve element 14, including a disk or bottom 15 and an annular lateral flange or casing 16. A sleeve 17 is arranged within the casing 16 and is concentric with relation thereto. The parts 15, 16 and 17 are preferably formed integral. The cylindrical casing 16 preferably slightly decreases in diameter upwardly, corresponding to the taper of the chamber 11, so that these parts will not tend to stick or jam. Rigidly attached to the web 12, at its center, is a vertical shaft or post 18, having the sleeve 17 slidable thereon, and carrying a horizontal pin 19, which extends radially through elongated slots 20, formed in the sleeve. The valve element 14 is moved downwardly by a compressible coil spring 21, engaging beneath the pin 19. It is thus seen that the valve element is free to reciprocate vertically but cannot turn upon its vertical axis, due to the pin 19 and the slots 20. The bottom or web of the valve element has segmental openings 20 21' and alternate imperforate portions 22, arranged to cover the segmental openings 13. The segmental imperforate portions 22 are slightly larger than the segmental openings 13, to overlap the same, as shown.

The block 10 is provided with an L-shaped inlet port 23, and the passage of air through this port may be regulated by an adjustable screw-valve 24, as shown. This L-shaped port leads into a transverse port 25, having communications with the chamber 11 through a branch port 26, an intermediate opening 27 and a branch port 28. The branch port 28 is in communication with a port 29 having communication with a spraying valve device 30. This spraying valve device embodies a nozzle 31, and a needle-valve 32 to regulate the amount of water fed to the nozzle 31, as shown.

The block 10 is arranged between the flanges 7 and 8', and is attached thereto by bolts 33, passing through openings 34.

Water is supplied to the valve device 30 through pipe 35, leading to a tank 36, supported at a suitable elevation, such as on the dash of an automobile. The tank 36 may be provided with water filtering or straining means, if desired.

The operation of the device is as follows:

When the engine is at rest, the valve element 14 is held in the lower-most position and its imperforate segmental portions 22 completely cover and close the segmental openings 13. When the engine is started, suction in the intake manifold acts upon the valve element 14 and raises it, thereby uncovering the segmental openings 13. The suction from the intake manifold is now transmitted to the carburetor to draw the gaseous charge therefrom, and this charge is mixed in the chamber 11 with the incoming air from the port 25 and the atomized water from the nozzle 31. The resultant explosive charge passes into the intake manifold. It will be seen that the valve element 14 has its opening movement dependent upon the degree of flow of fuel in the intake manifold and hence the extent of such opening movement is in proportion to the speed of the engine. In addition to supplying air and moisture to the charge from the carburetor, the device serves as a check valve, closing toward the carburetor, thus preventing back firing from the manifold to the carburetor.

It is to be understood that the form of our invention herewith shown and described is to be taken as a preferred embodiment of the same and that various changes in the shape, size and arrangement of parts may be resorted to without departing from the spirit of our invention or the scope of the sub-joined claims.

Having thus described our invention, we claim:

1. A device comprising a body adapted to be arranged between the outlet of the carburetor and the intake manifold of an internal combustion engine, said body having a chamber adapted to communicate with the intake of the manifold and a plate arranged near the intake of the chamber, said plate having an imperforate portion and an opening, said body having a fluid supply port passing through the side wall of the chamber and a reciprocatory valve element including a disk and a marginal portion disposed upon the outlet side of the plate, said disk having an imperforate portion which contacts with said plate to cover and close the opening in the plate and an opening to be covered and closed by the imperforate portion of the plate when the disk has substantially its entire contact face seated upon the plate which contacts with said disk, said marginal portion of the valve element serving to cover and uncover the outlet end of the port.

2. A device comprising a body adapted to be arranged between the outlet of a carburetor and the intake manifold of an internal combustion engine, said body having a chamber adapted to communicate with the intake of the manifold and a plate arranged near the intake end of the chamber, said plate having an imperforate portion and an opening, said body having a fluid supply port passing through the side wall of the chamber upon the outlet side of the plate and spaced from the plate, and a reciprocatory valve element having approximately a sliding fit within the chamber and including a disk and a marginal portion which contacts with said plate, said disk having an imperforate portion to cover and close the opening in the plate and an opening to be covered and closed by the imperforate portion of the plate when the disk has substantially its entire contact face seated upon the plate which contacts with said disk, said marginal portion serving to cover the outlet end of the port when the disk is seated and uncovering such port when the disk is moved a substantial distance from its seat.

3. A device comprising a body adapted to be arranged between the outlet of a carburetor and the intake manifold of an internal combustion engine, said body having a cylindrical chamber adapted to communicate with the intake of the manifold and a plate arranged near the intake end of the chamber, said plate having an imperforate portion and an opening, said body having a fluid supply port passing through the side wall of the chamber upon the outlet side of the plate, a stationary guide post arranged centrally of the plate and secured thereto, a reciprocatory cylindrical valve element having substantially a sliding fit within the chamber and including a tubular hub and a disk secured to the hub and a marginal flange, the tubular hub being slidably mounted upon the post and having an elongated slot, a transverse pin carried by the post and extending through the slot and holding the tubular hub against turning movement upon the post, a spring surrounding the tubular hub and engaging the transverse pin and serving to move the disk toward said plate, said disk having an imperforate portion to cover and close the opening in the plate, and an opening to be covered and closed by the imperforate portion of the plate when the disk has substantially its entire bottom face seated upon the plate, said marginal flange serving to cover the outlet end of the port when the disk is seated and uncovering such port when the disk is moved a substantial distance from its seat.

ALFRED E. DEARING.
WILLIAM B. PARKER.